United States Patent Office 3,473,668
Patented Oct. 21, 1969

3,473,668
STACKED FILTER ELEMENTS
Alan Donald Bunyard, Kenneth William Norris, and Alan Hubert Lucas, Sussex, England, assignors to Norris Filters Limited, Sussex, England, a British company
Filed Mar. 23, 1967, Ser. No. 625,483
Claims priority, application Great Britain Mar. 30, 1966, 14,194/66
Int. Cl. B01d 25/02, 39/14
U.S. Cl. 210—344                                           8 Claims

ABSTRACT OF THE DISCLOSURE

Fluid filtering apparatus including a plurality of coaxially stacked similar filter units each consisting of a pervious plate-like filter element and an impervious plate-like spacing element secured together around the outer peripheral edges, said units each having an aperture extending therethrough and the apertures of adjacent units in said stack registering to define a passage extending axially through said stack in such manner that fluid to be filtered flows between the outside of the stack and said passage via the filter elements.

---

The present invention relates to the filtering of fluid and, more particularly, is concerned with filter packs of the type in which pervious plate-like filter elements and impervious plate-like spacing elements alternate in a stack and have registering apertures therethrough forming a passage extending axially through the stack, the said elements being arranged to define fluid flow paths between the outside of the stack and said passage via the filter elements. Such a filter pack will hereinafter be referred to as "a filter pack of the type specified."

According to the present invention there is provided a filter pack of the type specified including a plurality of similar filter units each consisting of a plate-like spacing element, having a plurality of projections upstanding from opposite surfaces thereof, and a plate-like filter element, the elements of each unit being secured together face to face around the outer peripheral edges of the elements with the apertures therethrough in register, and the units being coaxially stacked with sealing gaskets interposed between the rims of the apertures in the facing filter elements and spacing elements of adjacent units, the arrangement being such that the projections on the surfaces of the spacing elements define the fluid flow paths between the outside of the stack and said passage via the filter elements.

According to a further aspect of the invention there is provided for use in a filter pack of the type specified, a filter unit consisting of a plate-like filter element with an aperture therethrough and a correspondingly apertured plate-like spacing element which has a plurality of projections upstanding from opposite surfaces thereof, said elements being secured together face to face around the outer peripheral edges of the elements with the apertures therethrough in register.

According to a still further aspect of the invention there is provided for use in the above described filter unit a disc-shaped spacing element having a central aperture defined by an inner edge of said disc and a plurality of projections extending radially substantially from the inner edge of said disc towards the outer edge of said disc, said projections being of progressively reducing height along the length thereof from a maximum height at one end to a minmum height at the opposite end and the projections being alternated so that the maximum heights of adjacent projections are disposed proximate the opposite disc edges and on opposite surfaces of said disc.

Figure 1:
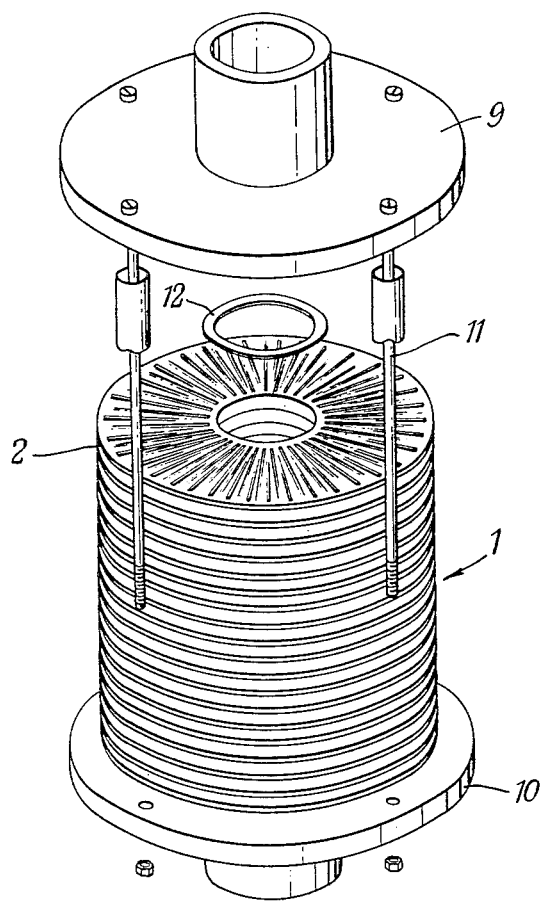
Figure 2:
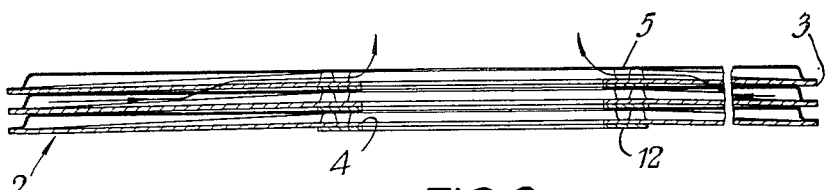
Figure 3:
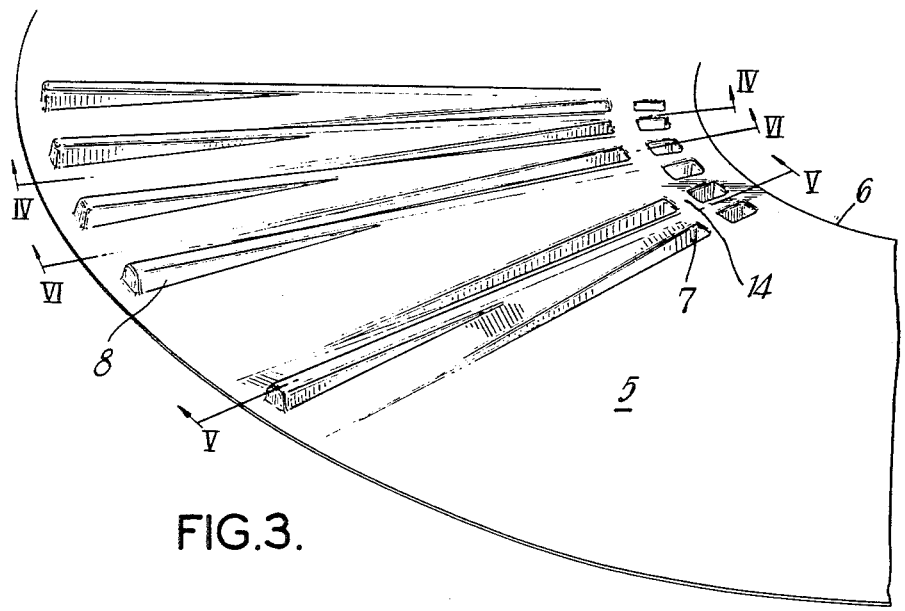
Figure 4:
Figure 5:
Figure 6:

In order that the invention may be more clearly understood and readily carried into effect, the same will now be described with reference to the accompanying drawings, in which:

FIGURE 1 shows an exploded perspective view of a filter pack incorporating a plurality of filter units, FIGURE 2 shows, on a larger scale, a section through three filter units in the assembled position for inclusion in the pack of FIGURE 1, FIGURE 3 shows an enlarged perspective view of part of a filter unit, FIGURE 4 is a section along the line IV—IV of FIGURE 3, FIGURE 5 is a section along the line V—V of FIGURE 3, and FIGURE 6 is a section along the line VI—VI of FIGURE 3.

Referring now the drawings, FIGURE 1 shows a filter pack 1 composed of a plurality of plate-like filter units 2. Each unit 2 comprises a disc-shaped filter element 3 having a circular central aperture 4 and a disc-shaped spacing element 5 having a similar aperture 6. These apertures are aligned with one another when the elements are assembled and coaxially secured together by, for example, welding, crimping or turning over of the mating outer peripheral edges to form a filter unit.

Each filter element 3 consists of sintered or woven material or filtering material of metal, mineral or organic matter and each spacing element 5 consists of a mating disc of metal or other non-porous material having a plurality of projections upstanding from opposite surfaces thereof. When the filter and spacing elements of a unit are secured together as aforesaid the projections on the internal surface of said spacing element abut the internal surface of said filter element and define passages for fluid flow between said elements.

In the preferred embodiment shown in FIGURES 3 to 6, the projections on each spacing element 5 are in the form of ribs extending radially substantially from the inner edge surrounding the central aperture 6 of said disc towards the outer peripheral edge. These ribs are most conveniently formed by upsetting the surfaces of the spacing element. To this end radially extending grooves 7 are stamped in the element whereby a groove stamped in one surface of said element forms a rib 8 on the opposite surface. In this preferred embodiment the spacing element 5 is so upset that on each surface of said element the radially extending grooves 7 and ribs 8 alternate with one another. Furthermore, the depth of the stamped grooves 7 decreases uniformly along the length thereof whereby the ribs 8 each taper along the length thereof from a maximum height at one end to a minimum height at the opposite end. The grooves may terminate flush with the element surface in which case the minimum height of the ribs is zero. The upset portions are alternated in such manner that the maximum heights of adjacent upset portions are disposed proximate the opposite edges and on opposite surfaces of said spacing element.

The ribs may, of course, be formed other than by stamping. For example, metal strips may be soldered or otherwise secured on the surfaces of a spacing element 5. Furthermore, the projections need not necessarily be in the form of ribs and may comprise localized bumps, pimples, bristles, etc. However, by providing the projections in the form of ribs an additional advantage is obtained in that the spacing elements are strengthened.

To assemble a filter pack a plurality of the above described filter units 2 are stacked in coaxial alignment and are firmly held between end plates 9, 10. In the preferred embodiment shown in FIGURE 1, ties 11 interconnecting said end plates may additionally serve for aligning the filter units in the assembled pack. At least one of the end plates has an aperture extending therethrough to register with a central passage extending axially through said stack and defined by the apertures 4 and 6 of the filter and spacing elements respectively.

The filter units 2 are so assembled that the ribs on the external surface of the spacing element 5 of each unit abut the external surface of the filter element 3 of an adjacent unit.

Advantageously the ribs 8 of the spacing elements 5 of adjacent units are aligned with one another and in this manner the filter elements are firmly supported on each side within an assembled pack. This, in turn, enables the filter elements to be constructed with a very thin cross-section thus increasing the efficiency of the assembled filter pack.

In order to maintain the desired spacing between adjacent filter units in an assembled pack and to prevent fluid from passing unfiltered between said units, sealing gaskets are provided between adjacent filter units. To this end washers 12 or like members of suitable material are provided and in one embodiment of the invention each filter element has a coined recess provided on the external surface thereof to form a seating for a washer 12. This washer then abuts the external surface of the spacing element 5 of an adjacent unit. The provision of a coined recess on the external surface of the filter element may, however, in some cases be unnecessary and the washer or like member then bears on the uninterrupted external surface of said filter element.

In the preferred embodiment of the invention shown in FIGURES 3 to 6 of the drawings, the radially extending ribs 8 on each spacing element 5 are interrupted at a point along the length thereof in such manner as to form an annular groove 13 around the inner edge of said element. This groove 13 is formed in one surface of the element and on the opposite surface of said element the bottom of the groove forms an annular flattened portion 14. In the assembled pack the washer or like member seats on this flattened portion 14 to provide an improved seal against fluid flow between adjacent filter units.

In a filter pack 1 comprising filter units 2 assembled as aforesaid, fluid to be filtered may flow from outside the pack between the filter element 3 and the spacing element 5 of adjacent filter units and through said filter element to effect the desired filtering. The filtered fluid then passes between said filter element and the spacing element secured thereto into the central passage of said pack defined by the apertures 4 and 6 of the filter and spacing elements. Alternatively, the configuration of the spacing elements hereinbefore described permits filtering also to be effected by flow in the opposite direction. In this case fluid to be filtered flows from the central passage through the pack to the space surrounding said pack.

A filter pack of the invention is thus assembled from filter units comprising standard component parts, only one form of filter element and one form of spacing element being required.

We claim:

1. A filter pack comprising a plurality of similar filter units, each unit consisting of an apertured plate-like spacing element, which is impervious to fluid flow, and an apertured plate-like filter element and having means securing the two elements together face to face with said apertures in register, means for locating said units coaxially in a stack with the filter element of one unit facing the spacing element of the adjacent unit throughout the stack and with said unit apertures in register to define an axially extending central passage through said stack, and a plurality of radially positioned projections provided on opposite surfaces of each said spacing element, characterized in that (a) the two elements of each unit are secured together continuously around their outer peripheral edges, (b) a plurality of sealing gaskets are disposed alternately with the units throughout the stack to provide seals between rims defining said apertures in said facing filter and spacing elements of adjacent units, and (c) said projections define individual fluid flow paths which extend radially betwen the outside of said stack and said passage via the respective filter elements, each of said projections for each spacing element is formed to extend from a point which is radially inward from the outer peripheral edge of the spacing element to a point which is radially outward from the central aperture of the spacing element, and all projections on each surface of each spacing element are formed with substantially equal maximum height to the maximum heights of all remaining projections on a given surface of the spacing element, so that a stack of such filter units provides continuous radial support in direct contact with opposite surfaces of each filter element, said projections, filter elements and gaskets being so arranged and constructed that fluid may be filtered in either direction of flow across supported filter elements.

2. A filter pack as claimed in claim 1, further comprising two end plates located one at each end of the stack and tie bars interconnecting said end plates, at least one of said end plates being shaped to define an aperture therethrough which registers with the passage through said stack.

3. A filter pack as claimed in claim 2, wherein corresponding projections formed on the spacing elements of adjacent filter units are aligned with one another in the assembled pack.

4. For use in a filter pack as claimed in claim 1, a disc-shaped spacing element having an outer peripheral edge and an inner edge shaped to define a central aperture therethrough, a plurality of projections extending radially substantially from the inner edge of said disc towards the outer edge of said disc, said projections being of progressively reducing height along the length thereof from a maximum height at one end to a minimum height at the opposite end and the projections being alternated so that the maximum heights of adjacent projections are disposed proximate the opposite disc edges and on opposite surfaces of said disc.

5. A spacing element as claimed in claim 4, wherein each projection is formed by upsetting a portion of the spacing element to define a groove in one surface thereof and a corresponding rib or like projection on the opposite surface.

6. A filter unit as claimed in claim 1, wherein the filter element and spacing element are disc-shaped and are shaped to define a central aperture through said unit.

7. A filter unit as claimed in claim 6, wherein the external surface of the filter element is deformed so as to provide a recessed seating around the central aperture for a washer-like sealing gasket.

8. A filter unit as claimed in claim 6, wherein the projections on the inner surface of the spacing element are interrupted in a zone surrounding the central aperture to form an annular flattened seating on the outer surface for a washer-like sealing gasket.

References Cited

UNITED STATES PATENTS

| | | | |
|---|---|---|---|
| 2,750,047 | 6/1956 | Hasbrouck | 210—343 |
| 2,781,917 | 2/1957 | Swallow | 210—344 |
| 2,903,136 | 9/1959 | Buckman | 210—492 X |
| 3,209,915 | 10/1965 | Gutkowski | 210—492 X |

FOREIGN PATENTS 445,266  2/1949  Italy.

REUBEN FRIEDMAN, Primary Examiner

FRANK A. SPEAR, Jr., Assistant Examiner

U.S. Cl. X.R.

210—492